United States Patent
Bloy et al.

(10) Patent No.: US 12,062,089 B2
(45) Date of Patent: Aug. 13, 2024

(54) ASSISTED CHANNEL CREDIT APPLICATIONS WITH AUTOMATIC INTEGRATION INTO DIGITAL WALLETS

(71) Applicant: The Toronto-Dominion Bank, Toronto (CA)

(72) Inventors: Adrian Bloy, Ottawa (CA); Morgan Klein-MacNeil, Toronto (CA); Alan Tam, Markham (CA); Trevor Ross Gimbel, Mississauga (CA); Julianne Helen Fong, Toronto (CA)

(73) Assignee: The Toronto-Dominion Bank

( * ) Notice: Subject to any disclaimer, the term of this patent is extended or adjusted under 35 U.S.C. 154(b) by 0 days.

(21) Appl. No.: 16/670,601

(22) Filed: Oct. 31, 2019

(65) Prior Publication Data

US 2021/0133866 A1    May 6, 2021

(51) Int. Cl.
*G06Q 40/03*    (2023.01)
*G06Q 20/36*    (2012.01)

(52) U.S. Cl.
CPC ......... *G06Q 40/03* (2023.01); *G06Q 20/3672* (2013.01)

(58) Field of Classification Search
CPC .......................... G06Q 20/3672; G06Q 40/025
See application file for complete search history.

(56) References Cited

U.S. PATENT DOCUMENTS 10,068,226 B2 * 9/2018 Chandrasekaran .......................... G06Q 20/3674
10,475,025 B2 * 11/2019 Zarakas ............. G06Q 20/3672

2006/0277139 A1 * 12/2006 Poltorak ................ G06Q 40/03 705/38
2010/0306072 A1 * 12/2010 Ford, Jr. ............. G06Q 20/202 705/38
2012/0296804 A1 * 11/2012 Stibel ..................... G06Q 40/02 705/38

(Continued)

OTHER PUBLICATIONS

Q. Li, X. Zhang, J. -P. Seifert and H. Zhong, "Secure Mobile Payment via Trusted Computing," 2008 Third Asia-Pacific Trusted Infrastructure Technologies Conference, Wuhan, China, 2008, pp. 98-112, doi: 10.1109/APTC.2008.24. (Year: 2008).*

*Primary Examiner* — David P Sharvin
*Assistant Examiner* — Steven R Chism
(74) *Attorney, Agent, or Firm* — Fish & Richardson P.C.

(57) ABSTRACT

The present disclosure involves systems, software, and computer-implemented methods for providing assisted channel credit application completion for customers, where approval of the credit application results in an automatic integration of payment credentials into a corresponding digital wallet. One example method includes receiving, via an assisted channel user terminal, a request to apply for a new credit account for a customer. Input into a digital credit application is input by an employee or teller on behalf of the customer. A credit adjudication process is performed on the application, and, in response to approval, a new credit account associated with the customer and corresponding payment information is created. A system to which the set of payment information is to be provided is identified, and the set of payment information associated with the new credit account is transmitted to those systems to be automatically integrated into those systems' digital wallets.

20 Claims, 4 Drawing Sheets

(56) References Cited

U.S. PATENT DOCUMENTS

| | | | |
|---|---|---|---|
| 2014/0070001 A1* | 3/2014 | Sanchez | G06Q 20/321 |
| | | | 235/380 |
| 2014/0114857 A1* | 4/2014 | Griggs | G06Q 40/00 |
| | | | 705/44 |
| 2014/0180906 A1* | 6/2014 | Paisley | G06Q 40/03 |
| | | | 705/38 |
| 2016/0071094 A1* | 3/2016 | Krishnaiah | G06Q 20/308 |
| | | | 705/66 |
| 2017/0301170 A1* | 10/2017 | Brancaccio | G07F 19/20 |
| 2018/0211249 A1* | 7/2018 | Sims | H04W 12/0608 |
| 2018/0276656 A1* | 9/2018 | Goyal | G06Q 20/3223 |
| 2019/0087894 A1* | 3/2019 | Bloy | G06Q 20/1085 |
| 2019/0114608 A1* | 4/2019 | Nelms | G06Q 20/204 |
| 2019/0156335 A1* | 5/2019 | Safak | G06Q 20/3829 |
| 2020/0327529 A1* | 10/2020 | Mukherjee | G06Q 20/20 |

\* cited by examiner

ASSISTED CHANNEL CREDIT APPLICATIONS WITH AUTOMATIC INTEGRATION INTO DIGITAL WALLETS

TECHNICAL FIELD

The present disclosure involves systems, software, and computer-implemented methods for providing assisted channel credit application completion with customers at a financial institution, where the completion and approval of the credit application results in an automatic integration of payment credentials into a corresponding digital wallet.

BACKGROUND

Online and e-commerce transactions are ubiquitous in today's society. Many merchants, including those with brick and mortar locations, have found more and more of their sales to be delivered via online or connected channels. Using merchants' online platforms, customers may use their existing payment methods to complete transactions.

New credit applications typically result in a period of time during which an initial transaction may be available or allowable in response to a credit application acceptance and usage. However, the generated card may only be available for the single usage, and may not be available for future transactions. Further, any credit account may result in contingent liability on the part of the providing merchant.

SUMMARY

The present disclosure involves systems, software, and computer-implemented methods for providing assisted channel credit application completion with customers at a financial institution, where the completion and approval of the credit application results in an automatic integration of payment credentials into a corresponding digital wallet. In doing so, the personal nature of an assisted channel (e.g., via a bank teller or phone-based operative) can be used to achieve a significant digital improvement of both mobile and merchant digital wallets.

A first example system includes a communications module, at least one memory storing instructions and a repository storing a set of credit accounts, where each credit account is associated with a user, and at least one hardware processor that is interoperably coupled with the at least one memory and the communications module. The instructions can instruct the at least one hardware processor to perform operations, which can include receiving, via an assisted channel user terminal, a request to apply for a new credit account for a first customer. The request can be associated with an assisted channel interaction and a set of credit application information can be input by an associated channel user on behalf of the first customer, wherein the input includes a set of customer-specific information associated with the first customer. A credit adjudication process is performed based on the set of credit application information input associated with the first customer, and, in response to an approval during the credit adjudication process, a new credit account associated with the first customer is created, where the new credit account is associated with a set of payment information. A second system is identified to which the set of payment information is to be provided, and a first signal including the set of payment information associated with the new credit account can be transmitted via the communications module and through a first communication channel to the second system.

Implementations can optionally include one or more of the following features.

In some instances, the second system includes a merchant system, and wherein the request to apply for the new credit account is associated with an identification of the merchant system. In some of those instances, the first communications channel comprises a secure communication channel to an endpoint of the second system. In some of those instances, in response to receiving the first signal, the merchant system adds the set of payment information associated with the new credit account into a digital wallet at the merchant system for future purchases. In some instances, the first customer applies for a co-branded credit card associated with the merchant system via the assistance of the assisted channel user, the assisted channel user is associated with an assisted channel user terminal.

In some instances, the instructions further instruct the at least one hardware processor to identify a user device associated with the first customer, and in response to the new credit account associated with the first customer being created, open a second communication channel with a secure financial application executing at the identified user device, wherein the first communication channel and the second communication channel are different. A second signal including the set of payment information associated with the new credit account can then be transmitted via the communications module and through the second communication channel to the secure financial application executing at the identified user device. In some of those instances, in response to receiving the second signal including the set of payment information associated with the new credit account, the secure financial application is operable to initiate a tokenization process to tokenize the set of payment information using a tokenization service to obtain a payment token corresponding to the set of payment information, after which the payment token is integrated into a digital wallet available at the identified user device.

In some instances, the instructions further instruct the at least one hardware processor to, in response to the new credit account associated with the first customer being created, identify a set of terms and conditions associated with the new credit account, and transmit, via the communications interface and through a third communication channel associated with the first customer, the identified set of terms and conditions associated with the new credit account to the first customer.

In some instances, the second system is a user device associated with the first customer, where the user device is identified with an existing account associated with the first customer where a secure financial application executes. Further, transmitting the first signal via the communications module and through the first communication channel to the user device includes opening the first communication channel as a secure communication channel with the secure financial application executing at the user device and transmitting the first signal via the communications module and through the first communication channel to the secure financial application executing at the user device, where the first signal includes the set of payment information associated with the new credit account.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data. Some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings and from the claims.

DETAILED DESCRIPTION

The present disclosure describes various tools and techniques associated with providing assisted channel credit application completion with customers at a financial institution, where the completion and approval of the credit application results in an automatic integration of payment credentials into a corresponding digital wallet.

Assisted channel interactions with a financial institution or bank relate to interactions that are not performed directly by customers or users, such as through a financial application or website. In many instances, assisted channel interactions include an assisted channel user interacting with an assisted channel user terminal, computer, or device, where the assisted channel user can guide the customer through one or more interactions. For example, assisted channel users can be available in person at a physical bank location, or by phone or voice-based interactions through appropriate telecommunication connections, such as through a direct or corporate phone line, or through one-on-one voice and/or video interactions via computer or phone. As the interaction progresses, the assisted channel user can ask for and receive inputs for a credit application in some instances, such as when a customer walks into a local branch or connects to the institution's phone lines and speaks to a voice-based teller.

By providing in-person resources, the financial institution can assure that customers are able to obtain assistance for any particular needs or expected purchases. In some instances, the customer may have a particular purchase that they are interested in or need credit to finalize. Particular available credit cards, credit lines, and/or other potential products may be of particular interest to a customer based on those specific needs and can be considered by the assisted channel user during the interaction. Additionally, certain benefits and/or incentives may be associated with a particular type of available credit card(s), credit line(s), and/or other products. Based on a customer's particular and customized needs, particularly when considered in light of the available financial products provided by a financial institution, one or more particular credit products may be identified by the assisted channel user after some initial discussions and pre-screening of product requirements.

Once a particular product is selected, the assisted channel user can lead the customer through an application process and inputs. The customer can provide, in person, over the phone, or in any other suitable manner, the inputs to the assisted channel user, who can then input those into a digital credit application on the assisted channel user terminal. Once the application has been submitted, the credit can be adjudicated and, if approved, a new account can be opened.

Once opened, at least one of two potential paths may be traveled. In a first option, the original interactions and application may be for a specific merchant-based credit card or account, where the customer has identified, or with whom the customer is already associated (e.g., through defined connections in an existing account with the financial institution and the merchant or related system, such as point-based relationships via a loyalty account), and that the customer has authorized a push of the new credit account information to that merchant. In those instances, a new mechanism for automatically pushing information associated with the new credit account can be used to securely provide the merchant with the information needed to include the payment information of the new credit account into the customer's merchant-based digital wallet. In response to receiving the new payment information, the merchant system can validate that the information matches a corresponding account (in some instances, a matching process can occur before the validation), provide a new loyalty or customer account number if none existed previously, or otherwise provide a confirmation or request for more information to the customer about the new payment option.

In a second option, which may be performed on its own or in combination with the merchant integration, the creation of a new credit account can result in the new payment information being pushed immediately, or just after opening, into a digital wallet specific to the customer, such as an Apple Pay or Google Pay wallet usable on the customer's mobile device. In those instances, a user device associated with the customer can be identified, and using a secure communication channel between a secure financial application executing on the user device and the financial systems managing accounts, the relevant information can be shared. In doing so, a new payment token can be automatically requested by the secure financial application, and a new payment token can be added to the customer's digital wallet.

As noted, the present solution provides several significant benefits and advantages due to the architecture and processes in which the operations occur. In both examples, the new credit account can be immediately and automatically added to the relevant digital wallets associated with the customer directly after the new credit accounts are open, such that the new account can be immediately available for use in transactions and purchases. In the first option, the customer may be able to open a new session with a merchant system, identify particular items for purchase, and use the new credit account to complete the transaction, all without further interactions or entry of payment information into the merchant system. In the second option, the customer could exit a branch where interactions with the assisted channel user occurred, go into a store next door (or an online shopping application or web page), and immediately use their new payment account to complete the transaction. Each of the solutions provide the benefits of an automated initial interaction related to applying for credit to be introduced into a more personal interaction with assistance from one or more assisted channel users, where those interactions can still lead to immediate provisioning of payment information and/or payment tokens to particular digital wallets to be used for completing respective transactions.

Figure 1:
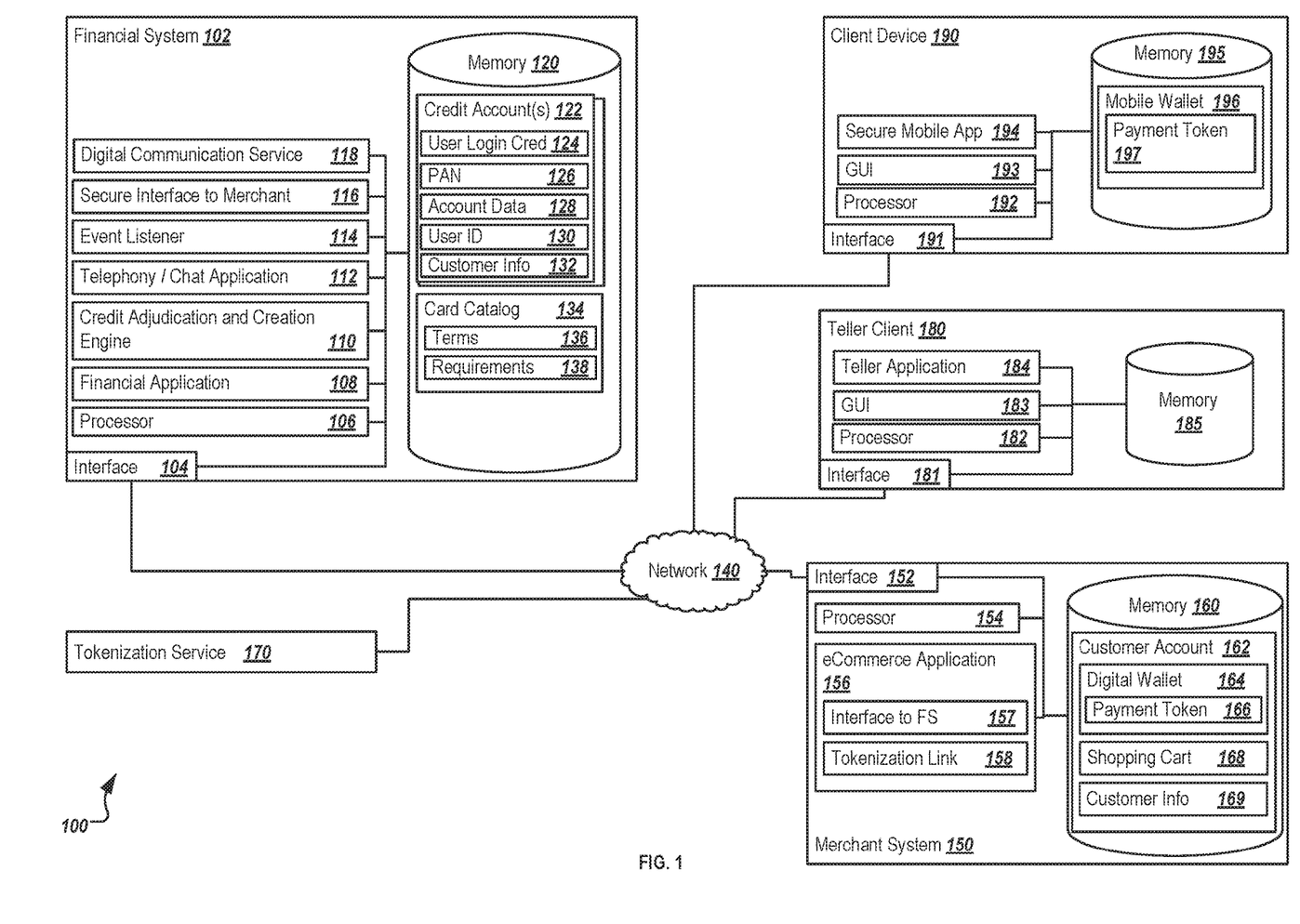
FIG. 1 is a block diagram illustrating an example system for providing assisted channel credit application completion with customers at a financial institution, where the completion and approval of the credit application results in an automatic integration of payment credentials into a corresponding digital wallet.

Turning to the illustrated example implementation, FIG. 1 is a block diagram illustrating an example system 100 for providing assisted channel credit application completion with customers at a financial institution, where the completion and approval of the credit application results in an automatic integration of payment credentials into a corresponding digital wallet. Specifically, the illustrated implementation is directed to a solution where a customer initially interacts with an assisted channel user to provide information related to a credit application. The assisted channel user, associated with the teller client 180 and teller application 184, can input information associated with the credit application, assisting the customer at a financial institution branch location or over a telephony or electronic communication system. In some instances, the customer may identify one or more particular merchants (e.g., associated with merchant system 150) associated with a reason for the request for new credit. In other instances, the customer may not have a specific merchant or type of card they want to apply for, but may have a best fit based on a conversation or interaction with the customer and assisted channel user. By accessing the card catalog 134 of the financial system 102, the assisted channel user can identify potential options for the customer, and identify a particular card or cards for which to apply. Some of the options may be directly associated with particular merchants, such as co-branded cards, while others may be independent of a particular merchant. Upon agreement on the particular card to pursue, the credit application can be completed and submitted.

Once submitted, the credit application is adjudicated and a determination of whether to approve the account is performed at the financial system 102. If approved, a new credit account 122 is created. In connection with the new account 122, the account information can be automatically provided to or accessed by a secure mobile application 194 on a client device 190 of the customer using its secure communication channel to the financial system 102 and its accounts of record, with that information being used to generate a payment token 197 for storage in a mobile wallet 196 of the customer. That token 197 can then be used immediately for purchases, even without a physical card associated with the account. Alternatively or in addition, the merchant system 150 can also receive the payment information associated with the new credit account 122, but through a different communication channel. An event listener 114 and secure interface to the merchant 116 can be used to create a secure communication channel to the merchant system 150 and its interface to the financial system 157. The communication can be encrypted, encoded, or otherwise protected, and the endpoint at the merchant system 150 may be secure, and may include an application programming interface (API) or other suitable endpoint. Once the information is received at the merchant system 150, a tokenization service 170 can be used to tokenize the received information, receive a corresponding payment token 166, and insert or integrate that token 166 into a customer account 162 related to the customer of the financial system 102. Once the payment token 166 is included in the merchant's digital wallet 164, any future or current transactions at the merchant system 150 can be completed using the payment token 166.

In general, system 100 allows the illustrated components to share and communicate information across devices and systems (e.g., merchant system 150, financial system 102, teller client 180, client 190, and tokenization service 170, among others, via network 140). As described herein, any of the systems, including the financial system 102, teller client 180, and/or merchant system 150 may be cloud-based components or systems (e.g., partially or fully), while in other instances, non-cloud-based systems may be used. In some instances, non-cloud-based systems, such as on-premise systems, client-server applications, and applications running on one or more client devices or local terminals, as well as combinations thereof, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, financial system 102, merchant system 150, teller client 180, and client 190 may be associated with any computer or processing devices such as, for example, a blade server, general-purpose personal computer (PC), Mac®, workstation, UNIX-based workstation, or any other suitable device. Moreover, although FIG. 1 illustrates a single financial system 102, system 100 can be implemented using a single system or more than those illustrated, as well as computers other than servers, including a server pool. In some instances, teller client 180 may be a part of or included in the financial system 102, but may act as a remote terminal or system to which the associated assisted channel user may log in to the financial system 102. Other illustrated components may be similarly separated, where suitable. In other words, the present disclosure contemplates computers other than general-purpose computers, as well as computers without conventional operating systems. Similarly, the teller client 180 and the client 190 may be any system that can request data and/or interact with the merchant system 150 and/or the financial system 102, including a system used to initiate a particular transaction that leads to using the solution described herein. The teller client 180 and the client 190 (which may also be referred to as client device 190), in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others. The client 190 may include one or more financial institution-specific applications executing on the client 190, or the client 190 may include one or more Web browsers or web applications that can interact with particular applications (e.g., the e-Commerce application 156 and/or the financial application 108)

executing remotely from the client 190. Similarly, the teller client 180 may include a teller application 184 specifically performing operations associated with the financial system 102, or may execute one or more web (or other) applications used to perform its functions.

The financial system 102 provides a backend system associated with a financial institution used to manage one or more accounts and financial services, including the issuance of credit. In the illustrated instance, the financial system 102 represents a financial institution capable of receiving applications for new credit accounts, where the applications for credit can be immediately evaluated and, if approved, a corresponding new credit account 122 can be generated. In this solution, the financial system 102 can receive credit application-related information from a teller client 180 (e.g., via teller application 184) associated with a request for credit. The request may be specific to a particular merchant-related card, or the request may be merchant agnostic. The request may also be specifically associated with a particular card or credit option stored in card catalog 134, which can include information on card terms 136 and card requirements 138. In some instances, the teller client 180 and its teller application 184 can interact with a financial application 108 executing at the financial system 102, which allows the credit application to be completed and submitted. In some instances, existing customer information 132 can be associated with a credit application for a particular customer, where that customer is already a customer of the financial institution associated with the financial system 102. In some instances, the existing customer information 132 can be auto-filled into the credit application before or during the application process. In other instances, the customer information 132 can be obtained with information newly included in the credit application, as well as from other authorized locations.

An event listener 114 can monitor a plurality of credit accounts 122 for newly created accounts, such as the account being newly opened. In response to detecting and identifying the new account, the new account information can be securely transmitted to the merchant system 150 (e.g., via a secure interface to merchant 116), where the information can be used to add the new payment information to a corresponding customer account 162, which may be already existing or can be created/initiated upon account creation. The corresponding customer account 162 can be identified based on information provided by the customer during the application process, or in response to the information being sent to the merchant system 150. In some instances, the new credit account 122 may not be explicitly associated with a particular merchant. However, the customer may identify particular merchants to whom the new credit account 122 should be shared and added to a corresponding digital wallet 164. That information may be included in the credit application, or may be defined in a set of preferences or rules associated with an existing customer account.

In addition, the event listener 114 can initiate a digital communication service 118, where terms and conditions 136 associated with the new credit account 122 can be identified upon approval and opening of the new account 122, and can be transmitted to the client 190 associated with the customer to fulfill any legal and regulatory requirements related to new credit disclosures.

As illustrated, the financial system 102 includes or is associated with interface 104, processor(s) 106, financial application 108, credit adjudication and creation engine 110, telephony or chat application 112, event listener 114, the secure interface to merchant 116, the digital communication service 118, and memory 120. While illustrated as provided by or included in the financial system 102, parts of the illustrated contents may be separate or remote from the financial system 102, or the financial system 102 may be distributed. Still further, some portions of the teller client 180 may also be part of the financial system 102, but are illustrated separately for explanation purposes.

The interface 104 of the financial system 102 is used by the financial system 102 for communicating with other systems in a distributed environment—including within the environment 100—connected to the network 140, e.g., client 190, teller system 180, merchant system 150, as well as other systems communicably coupled to the illustrated financial system 102 and/or network 140. Generally, the interface 104 comprises logic encoded in software and/or hardware in a suitable combination and operable to communicate with the network 140 and other components. More specifically, the interface 104 may comprise software supporting one or more communication protocols associated with communications such that the network 140 and/or interface's hardware is operable to communicate physical signals within and outside of the illustrated environment 100. Still further, the interface 104 may allow the financial system 102 to communicate with the teller client 180, client 190, and/or other portions illustrated within the financial system 102 to perform the operations described herein.

Network 140 facilitates wireless or wireline communications between the components of the environment 100 (e.g., between the financial system 102, merchant system 150, the teller client(s) 180, the client(s) 190, tokenization service 170, etc.), as well as with any other local or remote computers, such as additional mobile devices, clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the merchant system 150, the financial system 102, the teller client 180, etc.) may be included within or deployed to network 140 or a portion thereof as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, 5G, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The financial system 102, as illustrated, includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the financial system 102. Specifically, the processor 106 executes the algorithms and operations described in the illustrated figures, as well as the various software modules and functionality, including the functionality for sending communications to and receiving transmissions from the merchant system 150, the teller client 180, and/or the client 190, as well as to other devices and systems. Each processor 106 may have a single or multiple core, with each core available to host and execute an individual processing thread. Further, the number of, types of, and particular processors 106 used to execute the operations described herein may be dynamically determined based on a number of requests, interactions, and operations associated with the financial system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The financial application 108 may be a web page, web-based application, application programming interface (API), or other software or component provided by or associated with the financial system 102, and can present or include an interactive website, form, or other interactive component at which information associated with a credit application can be submitted. The financial application 108 may be a front-end used to receive input for the credit application via at least the teller client 180 and teller application 184, and can provide the received information to one or more backend systems, such as the credit adjudication and creation engine 110. In some instances, the financial application 108 may be dedicated to receiving credit applications, while in others, the financial application 108 may provide additional functionality, including account review, financial investment and money transfer functionality, and other available operations and actions associated with the financial system 102. For purposes of the present disclosure, the financial application 108 can interact with the teller client 180 directly, via teller application 184, or via any other suitable application, such as a browser or dedicated application accessed by an assisted channel user.

As described, the financial application 108 can be accessed in response to a customer working with an assisted channel user (e.g., associated with a teller client 180) to submit a credit application. As noted, the set of customer information 132 can be input by the assisted channel user (e.g., using the teller application 184) and/or obtained from an existing account of the customer already available at the financial system 102. In some instances, additional customer information 132 can be obtained from other sources, such as other authorized accounts and data sources, including public and private data sources. The set of customer information 132 used to complete the credit application can include personal identifying information (PII), such as social security numbers (SSNs), driver's license information, demographic information, and other relevant data. Additionally, particularly where the new credit account 122 may be associated with a particular merchant, either as a co-branded card and/or for future purchases, information associated with one or more customer accounts 162 at one or more merchant systems 150 (or other relevant systems) can be included in the credit application and/or the customer information 132. That information can be used to connect or otherwise correlate the accounts to which the payment information should be sent once the new credit account 122 is opened. Additionally, the customer information 132 can identify contact information associated with the customer, including associated email addresses, phone numbers, communication program aliases, and any other suitable information. In some instances, the customer information 132 can directly identify a particular device or client 190 associated with the customer, and can use that information to identify where payment information is to be provided in order to integrate the new credit account 122 into the customer's associated mobile digital wallet 196.

Once information associated with the application for credit is completed and submitted by the teller application 184, the credit adjudication and creation engine 110 of the financial system 102 is used to perform a creditworthiness analysis based on one or more credit rules defined by the financial institution, which can be used to determine whether the credit application is to be accepted or rejected, as well as an amount associated with the acceptance, where appropriate. The credit adjudication and creation engine 110 can access one or more databases and credit bureaus when making its determination, and, in some cases, can provide an instantaneous or near-instantaneous decision regarding the credit application. In response to approving the credit application, the credit adjudication and creation engine 110 can create a new credit account 122 for the customer as approved during the adjudication process. The credit adjudication and creation engine 110 may act as a master account management system, and can perform credit provisioning and management within the financial system 102. In some instances, the credit adjudication and creation engine 110, or a portion thereof, may be a credit management system offered by TSYS or another vendor. The credit adjudication and creation engine 110 generates the new credit account 122, as well as some or all of the information associated with the customer received from the credit application, which can be stored in the account data 128. In some instances, a personal account number (PAN) 126 may be generated for the credit account 122, which may be identical to the account number of the new credit account 122, or may be an alternative identifier to be used in transactions, and can be associated with a physical credit card if such a card is to be generated. The PAN 126 may also be associated with the set of payment information shared with the digital wallets, in some instances. In many instances, the result of the credit generation process is the creation of a new, unique account number that can be used to perform one or more transactions on the new credit account 122. In addition, a set of user login credentials 124 can be generated that are associated with the new account 122, and can be used for later access to the account 122. If the customer is already associated with an existing account, the login credentials 124 may be similar or identical to those already used in the related account. In some instances, a particular personal account number (PAN) 126 can be associated with the credit account 122, which may be identical to the account number of the new credit account 122, or may be an alternative identifier to be used in transactions. A user ID 130 may be associated with the credit account 122, which may be similar to or different from the user login credentials 124 and/or the PAN 126, which may be used internally to the financial system 102 or to connect a particular credit account 122 to a particular customer account 162 at the merchant system 150. The user ID 130 may also include a set of loyalty account information associated with the merchant system 150 in some instances, which can be used to identify the customer at each system. The user ID 130 information may be associated with the merchant account-related information included in the customer information 132, or it may be different.

A telephony or chat application 112 may be included in the financial system 102, and may be used by the teller client 180 to interact with one or more remote customers. In particular, the telephony or chat application 112 may provide functionality to allow for voice, video, and chat communications with customers working with an assisted channel user. The telephony or chat application 112 is illustrated as part of the financial system 102, but may be available at the teller client 180 as well. In some instances, the application 112 may be included as part of the functionality of the financial application 108. The telephony or chat application 112 can be used where the assisted channel interaction is not an in-person interaction with the assisted teller user.

Event listener 114 may be any program, agent, application, daemon, or other suitable component that performs monitoring of the plurality of credit accounts 122 managed by or associated with the financial system 102 to determine when a new account is generated. When a new account is generated, the event listener 114 can notify a digital communication service 118 of the new credit account 122, where the digital communication service 118 can cause a set of terms and conditions 136 associated with the new credit account 122 to be transmitted to the client 190 to meet or exceed any legal and/or regulatory notification requirements. The digital communication service 118 can cause the notifications to be provided to any suitable endpoint via any suitable channel, including email, text messages, secure in-app messaging, phone-based disclosures, or any other channel, including by pushing the notifications to the secure mobile application 194 executing at the client 190, if available.

If the new credit account 122 is associated with one or more customer accounts 162 at any merchant systems 150, such as one identified in the user ID 130 or customer information 132, the event listener 114 can initiate an interaction to securely provide the merchant system 150 with payment data and information associated with the new credit account 122. The secure transmission can be performed via a secure interface to the merchant 116, which may be a particular API, agent, program, or other interface or channel which can provide the information in a secure manner. In some instances, the secure interface 116 may include a connection to an API of the merchant system 150, where the payment information is transmitted and associated with a particular customer account 162. As described, the event listener 114 can identify a unique customer account number associated with the merchant system 150 (e.g., a frequent flyer number, a loyalty account number, etc. that was included in or associated with the credit application and/or is stored in or associated with the new credit account 122), or can alternatively, if no unique identifier is provided, execute a matching algorithm based on a set of data available in or associated with the new account 122, to identify one or more potential matches of existing accounts, which can be based on overlapping or consistent data between the new credit account 122 information and the information maintained by the merchant system 150. In still other instances where no existing customer account 162 can be matched to the new credit account 122, the merchant system 150 associated with the new credit account 122 can trigger a new merchant account generation process to provide an account at the merchant system 150 for storing the payment information and performing further transactions.

Memory 120 of the financial system 102 may represent a single memory or multiple memories. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including financial data, user and/or account information, administrative settings, password information, caches, applications, backup data, repositories storing business and/or dynamic information, and any other appropriate information associated with the financial system 102, including any parameters, variables, algorithms, instructions, rules, constraints, or references thereto. Additionally, the memory 120 may store any other appropriate data, such as VPN applications, firmware logs and policies, firewall policies, a security or access log, print or other reporting files, as well as others. While illustrated within the financial system 102, memory 120 or any portion thereof, including some or all of the particular illustrated components, may be located remote from the financial system 102 in some instances, including as a cloud application or repository, or as a separate cloud application or repository when the financial system 102 itself is a cloud-based system. As illustrated and previously described, memory 120 includes a plurality of credit accounts 122 associated with particular customers, as well as a card catalog 134 identifying a set of credit card options provided by the financial system 102, which can include the terms and conditions 136 of the corresponding cards, as well as the qualification requirements 138 that may be defined for the customers (e.g., credit score, annual salary requirements, prior account status at the financial system 102, etc.). Additional and/or alternative information may be stored in or associated with memory 120. In some instances, the credit accounts 122 may be stored in an account book of record maintained by a third-party, where information defining particular accounts 122 is stored remote from the financial system 102, such as in a TSYS-managed system. The financial system 102 can access and update the information using any suitable connection, and can use the third-party system to manage the created accounts.

While not illustrated herein, once a new credit account is generated, the financial system 102 may optionally trigger a physical card generation process, where a physical card is generated and can be physically delivered to the user. Any suitable process for card generation can be used, and can allow the user to use the new credit account offline and at locations other than those associated with the merchant system 150, or brick-and-mortar locations of the merchant system 150. In some instances, no physical card may be generated after the new credit account 122 is generated.

Merchant system 150, as described, represents a system associated with a merchant offering goods and/or services, and may be any computing system providing those capabilities. In some instances, the merchant system 150 may be associated with both an online and brick-and-mortar business, where the merchant system 150 described in FIG. 1 is associated with an e-Commerce or online portion of the business. The merchant system 150 may, in some cases, be associated with an online or e-Commerce-only business or enterprise. In any event, customers may be able to access the goods and/or services of the merchant system 150 via the e-Commerce application 156, which may be associated with a dedicated application used at the client 190, or may be a web site or web-based application that allows customers to perform e-Commerce activities through their web browsers or associated general applications. In some instances, the merchant systems 150 can be associated with particular merchants providing co-branded or loyalty-based credit cards in association with a financial institution associated with the financial system 102, which may be the particular card and credit account being applied for in the present solution through the assisted channel interactions. In other instances, a non-partner or loyalty-based card may be applied for using the described system. Using the solutions described herein, the merchant system 150 can receive payment information from the financial system 102 in response to the new credit account 122 being opened, and can add that payment information into the merchant's digital wallet 164 to facilitate future transactions for the customer. As mentioned, if no existing customer account 162 is associated with the customer, the e-Commerce application 156 can manage a registration process, and can use the received information to create a new customer account 162 for the customer to use.

As illustrated, merchant system 150 includes interface 152 (similar to or different from interface 014), processor(s) 154 (similar to or different from processor(s) 106), e-Commerce application 156, and memory 160 (similar to or different from memory 120). Interface 152 allows the merchant system 150 to communicate with network 140 and any other communicably coupled systems, including financial system 102, client 190, teller client 180, and tokenization service 170, among others. Processor 154, which may include one or more processors similar to processor 106, can be used to execute the operations of the merchant system 150, including those related to the e-Commerce application 156. The illustrated merchant system 150 is intended to encompass any computing device such as a desktop computer, laptop/notebook computer, cloud computing system, tablet computing device, server, workstation, one or more processors within these devices, or any other suitable processing device. In general, the merchant system 150 and its components may be adapted to execute any operating system, including Linux, UNIX, Windows, Mac OS®, Java™, Android™, or iOS. In some instances, the merchant system 150 may comprise a computer that includes an input device, such as a keypad, touch screen, or other device(s) that can interact with one or more e-Commerce applications 156, as well as point-of-sale applications, where appropriate. In some instances, the e-Commerce application 156 may represent a web page, web site, or web application, including one accessed using a dedicated mobile application, where customers can add items from a catalog or interactive website to a shopping cart 168 associated with the customer account 162, and can allow those customers to complete the transaction using one or more credit cards, including newly added cards received through the present solution.

The e-Commerce application 156 can be any application, web site, or other program or application that manages online transactions associated with a merchant's customers. Users can login to the e-Commerce application 156 and may be associated with a particular customer account 162, where one or more items can be added to a shopping cart 168 from an online catalog of goods and services. Once the shopping cart 168 has at least one item in it, the transaction can be completed if the customer wishes. When completing the transaction, the customer has the opportunity to use a new payment option or one of the payment tokens 166 associated with their account. Using this solution, customers who open new credit accounts 122 can identify particular merchants they are likely to do business with later, or who are associated with the co-branding or benefits associated with their new credit account, and can have the payment options added to those accounts prior to beginning a new transaction, thereby saving time, adding convenience, and removing a potential point of friction during an online transaction.

The e-Commerce application 156 can include an interface to the financial system 157, which can provide functionality to both send information to and receive information from the financial system 102. In some instances, the interface to the financial system 157 may be a secure interface or endpoint that allows secure transfer of sensitive data, including payment information associated with the new credit account 122. In some instances, two or more interfaces may be available for communication for different purposes. In particular, the interface to the financial system 157 can receive communications including the new payment information from the secure interface to the merchant 116. Once received, the payment information can be provided to the tokenization link 158, which can request tokenization of the payment information by the tokenization service 170. In doing so, the payment information can be tokenized and associated with a digital wallet 164 managed under the customer account 162, and the corresponding payment token 166 can be available to be used immediately. In many cases, the tokenization process can be performed immediately in response to receiving the set of payment information from the financial system 102, and prior to any new transaction, such that the new payment method is available once the customer visits the corresponding e-Commerce application 156.

As illustrated, memory 160 includes one or more customer accounts 162, where particular customer accounts 162 can, in some instances, be associated a digital wallet 164 storing one or more payment tokens 166 corresponding to particular credit accounts 122. In some instances, non-tokenized payment information may also be stored in or associated with the customer accounts 162. Customer information 169 may be associated with a customer account 162, and may include a unique identifier associated with the customer account, such as a loyalty or membership number, among others. In some instances, information about the customer can be included in the customer information 169 that can be used to identify and/or match information received from the financial system 102 regarding a new credit account 122 to a particular customer account 162 already existing at the merchant system 150.

As illustrated, one or more clients 190 may be present in the example system 100. Each client 190 may be associated with a particular customer, or may be accessed by multiple customers, where a particular customer can interact with the e-Commerce application 156 to purchase one or more items. Client 190 may be a client device at which a particular customer is linked or associated, or a client device through which the particular customer, using secure mobile application 194, can interact with the financial system 102 in a secure manner. As illustrated, the client 190 may include an interface 191 for communication (similar to or different from interfaces 104 and 152), at least one processor 192 (similar to or different from processors 106 and 154), a graphical user interface (GUI) 193, the secure mobile application 194, and memory 195 (similar to or different from memories 120 and 160).

The illustrated client 190 is intended to encompass any computing device such as a desktop computer, laptop/ notebook computer, mobile device, smartphone, personal data assistant (PDA), tablet computing device, one or more processors within these devices, or any other suitable processing device. In general, the client 190 and its components may be adapted to execute any operating system, including Linux, UNIX, Windows, Mac OS®, Java™, Android™, or iOS. In some instances, the client 190 may comprise a computer that includes an input device, such as a keypad, touch screen, or other device(s) that can interact with one or more client applications, such as one or more mobile applications, including a web browser, mobile wallet 196, secure mobile application 194 or other banking applications, and an output device that conveys information associated with the operation of the applications and their application windows to the user of the client 190. Such information may include digital data, visual information, or a GUI 193, as shown with respect to the client 190. Specifically, the client 190 may be any computing device operable to communicate with the financial system 102, other clients 190, one or more merchant systems 150, and/or other components via network 140, as well as with the network 140 itself, using a wireline or wireless connection. In general, client 190 comprises an electronic computer device operable to receive, transmit, process, and store any appropriate data associated with the environment 100 of FIG. 1.

The secure mobile application 194 executing on the client 190 may include any suitable application, program, mobile app, or other component. In particular, the secure mobile application 194 may be a trusted application associated with the financial system 102, where the secure mobile application 194 is able to uniquely identify a particular device as associated with a particular customer. In some instances, the customer can login to the secure mobile application 194 using the user login credentials 124 for one or more credit accounts 122, and can access information related to their account. In some instances, the secure mobile application 194 may be used to receive secure messages from the financial system 102, such as messages related to terms and conditions of new accounts, as well as other finance-related communications. In some instances, the secure mobile application 194 can be associated with web browsing functionality, or in other instances, the client 190 may also be associated with one or more applications capable of interacting with the merchant systems 150 to purchase one or more items different than the secure mobile application. The secure mobile application 194 can interact with the financial system 102, one or more merchant systems 150 (e.g., to browse and/or purchase goods and services, etc.), or other systems, via network 140. In some instances, the secure mobile application 194 may be dedicated to operations associated with the financial system 102, or may be otherwise be a generic application. The secure mobile application 194 may be or may include the functionality associated with a web browser, where the functionality of the secure mobile application 194 may be realized through a web application or website the user can interact with via the secure mobile application 194. In other instances, the secure mobile application 194 may be a remote agent, component, or client-side version of the financial system 102, or a dedicated application associated with the financial system 102. Other applications may execute at the client 190, and may be used to interact with other components illustrated in FIG. 1. Applications executing at the client 190 may be used to view or interact with the financial system 102 and/or the merchant system 150, and can allow or provide interactions for performing transactions with the merchant system 150 and the financial system 102, as described herein. In some instances, the client 190 may include functionality that allows the associated user or customer to access one or more assisted channel users, such as through an audio- or interactive video-based application process, as well as through chat or other assisted channels.

GUI 193 of the client 190 interfaces with at least a portion of the environment 100 for any suitable purpose, including generating a visual representation of any particular secure mobile application 194 or other application, and/or the content associated with any components of the financial system 102 and/or merchant system 150. In particular, the GUI 193 may be used to present screens and information associated with selecting and adding items to shopping cart 168 using the e-Commerce application 156, as well as reviewing account information associated with the financial system 102 via the financial application 108, among others. GUI 193 may also be used to view and interact with various web pages, applications, and web services located local or external to the client 190. Generally, the GUI 193 provides the user with an efficient and user-friendly presentation of data provided by or communicated within the system. The GUI 193 may comprise a plurality of customizable frames or views having interactive fields, pull-down lists, and buttons operated by the user. In general, the GUI 193 is often configurable, supports a combination of tables and graphs (bar, line, pie, status dials, etc.), and is able to build real-time portals, application windows, and presentations. Therefore, the GUI 193 contemplates any suitable graphical user interface, such as a combination of a generic web browser, a web-enable application, intelligent engine, and command line interface (CLI) that processes information in the platform and efficiently presents the results to the user visually.

As illustrated, memory 195 may include the mobile wallet 196 of an associated user, and can store the payment token 197 of some, any, or all of the credit accounts 122 connected to or associated with the customer. In some instances, in addition to the payment token 166 being added to the digital wallet 164, a mobile wallet can be maintained by the client 190, and a corresponding token 197 may be added to the mobile wallet at the client 190 and used for future transactions.

The tokenization service 170, described above, may be associated with any suitable or associated payment network associated with the new credit account 122. For example, if the new credit account 122 is associated with a new Visa card, then the payment network token service 170 may be a Visa-associated service capable of generating payment tokens and credentials related to or associated with the credit account 122. Other payment networks may also be used, while third-party services authorized by the payment networks and financial systems 102 may also be used instead. The tokens created by the service 170 can link the tokens to actual accounts 122 without specifically identifying the PAN 126 or account number of the credit account 122, allowing more secure transactions to be performed. Once the digital version of the credit card (i.e., the payment token 197 or 166) is provisioned to their respective digital wallet 196, 164, transactions can be performed with the corresponding merchant system 150 or other systems to complete transactions.

The teller client 180, as previously described, can be associated with one or more assisted channel users, who can assist customers with credit applications and other financial services. The teller client 180 and the assisted channel users can be used instead of online tools that may allow customers to submit their own applications or directly interface with the financial application 108. In some instances, the teller client 180 can be a part of the financial system 102, or a terminal that allows access to assisted channel users who are working with customers. The teller client 180 may be located within a branch of a financial institution associated with the financial system 102, or may be located remotely from a branch, such as at a call center or other location where they can interact with customers over a telephone call or chat connection, in some instances using the telephony or chat application 112 of the financial system 102. The assisted channel user can interact with a teller application 184 to manage interactions, where the teller application 184 can provide the assisted channel user the ability to interact with and complete credit applications, as well as identify for customers one or more of the credit cards or accounts detailed in the card catalog 134. The assisted channel user can identify or confirm a particular card that may be of interest to the customer, and can identify that card as the particular card to be applied for via the teller application 184.

As illustrated, the teller client 180 may include an interface 181 for communication (similar to or different from interfaces 104, 152, and 191), at least one processor 182 (similar to or different from processors 106, 154, and 192), a graphical user interface (GUI) 183 (similar to or different from GUI 193), the teller application 184, and memory 185 (similar to or different from memories 120, 160, and 195). The illustrated teller client 180 is intended to encompass any computing device such as a desktop computer, laptop/notebook computer, mobile device, smartphone, personal data assistant (PDA), tablet computing device, one or more processors within these devices, or any other suitable processing device. In general, the teller client 180 and its components may be adapted to execute any operating system, including Linux, UNIX, Windows, Mac OS®, Java™, Android™, or iOS. In some instances, the teller client 180 may comprise a computer that includes an input device, such as a keypad, touch screen, or other device(s) that can interact with one or more client applications, such as one or more mobile applications, including a web browser, teller application 184, or other related applications, and an output device that conveys information associated with the operation of the applications and their application windows to the user of the teller client 180. Such information may include digital data, visual information, or a GUI 183, as shown with respect to the teller client 180. Specifically, the teller client 180 may be any computing device operable to communicate with the financial system 102 and/or other components via network 140, as well as with the network 140 itself, using a wireline or wireless connection. In general, teller client 180 comprises an electronic computer device operable to receive, transmit, process, and store any appropriate data associated with the environment 100 of FIG. 1.

The teller application 184 executing on the teller client 180 may include any suitable application, program, mobile app, or other component. The teller application 184, as noted, can provide the assisted channel user the ability to complete credit applications for particular cards on behalf of the customer. The teller application 184 may be or may include the functionality associated with a web browser, where the functionality of the teller application 184 may be realized through a web application or website with which the user can interact. In other instances, the teller application 184 may be a remote agent, component, or client-side version of the financial system 102, or a dedicated application associated with the financial system 102. Other applications may execute at the teller client 180, and may be used to interact with other components illustrated in FIG. 1. In some instances, the teller client 180 may include functionality that allows the associated assisted channel user the ability to assist customers in various operations, including through in-person interactions, as well as audio- or interactive video-based application process, as well as through chat or other assisted channels. GUI 183 may be similar to GUI 193, and can generate a visual representation of applications and information related and/or the content associated with any components of the financial system 102.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
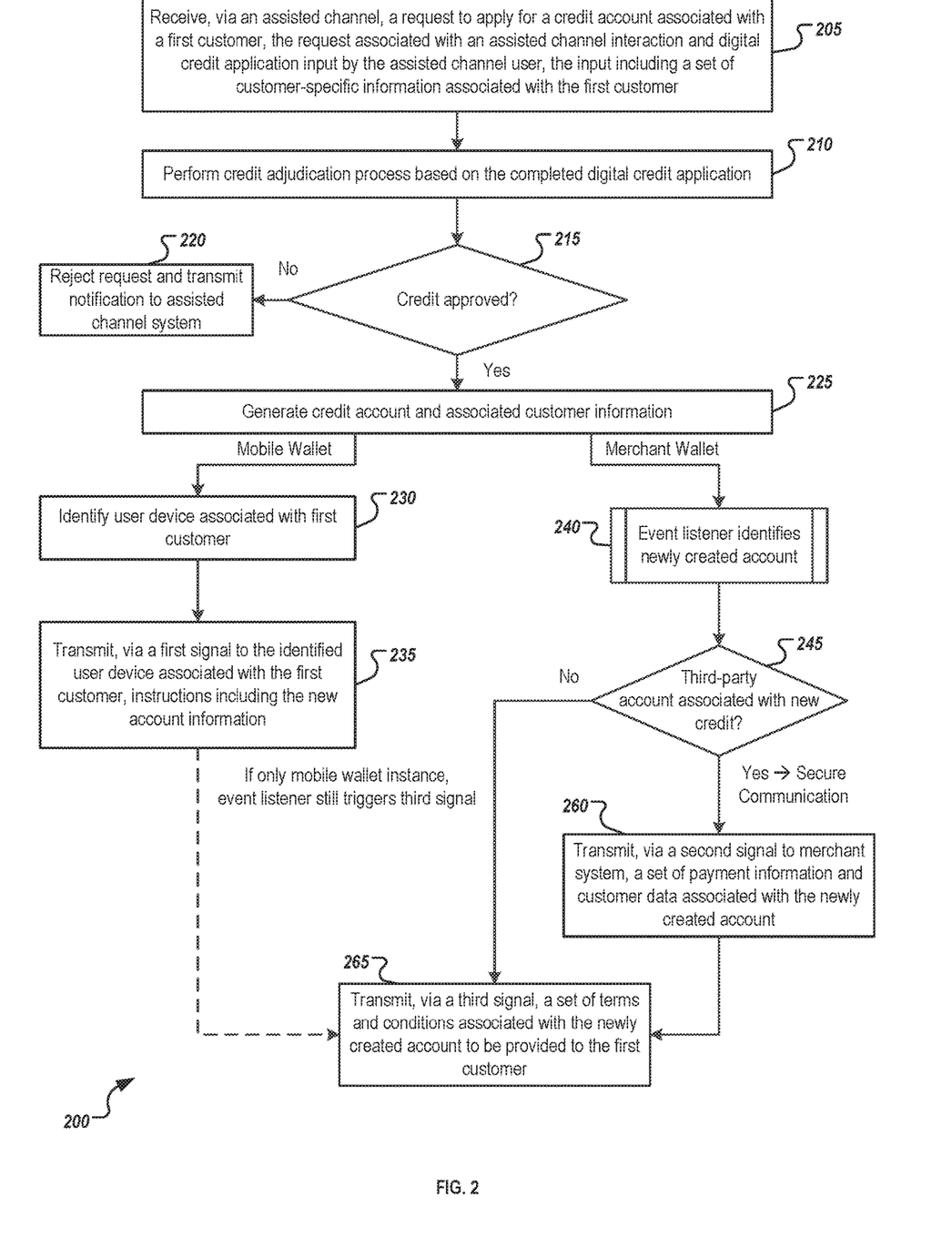
FIG. 2 is a flow diagram of an example method for providing assisted channel credit application completion with customers at a financial institution, where the completion and approval of the credit application results in an automatic integration of payment credentials into a corresponding digital wallet from a perspective of a financial system in one example implementation.

FIG. 2 is a flow diagram of an example method for providing assisted channel credit application completion with customers at a financial institution, where the completion and approval of the credit application results in an automatic integration of payment credentials into a corresponding digital wallet from a perspective of a financial system in one example implementation. Method 200 may be performed by system 100 and its components in some instances. However, it will be understood that method 200 may be performed, for example, by any other suitable system, environment, software, and hardware, or a combination of systems, environments, software, and hardware as appropriate.

At 205, a request to apply for a credit account can be received via an assisted channel interaction, where the request to apply for the credit account is then input by an assisted channel user on behalf of a customer requested credit. In some instances, the assisted channel user can identify one or more credit account or credit card options, some of which may be associated with a particular merchant or entity (e.g., co-branded credit cards). In some instances, the customer may already be associated with one or more accounts at the financial institution. In those instances, the assisted channel user may be able to access some existing data and information related to the customer to assist in completing the credit application. In some instances, one or more fields may be pre-populated with existing PII or other information. In some instances, the customer may also already be linked to one or more merchants, even those not associated with the new credit account. In those instances, information about a new credit account may, if authorized by the customer, be securely shared with those other merchants to add any payment information to those merchants' digital wallets.

At 210, in response to receiving the request, the set of transaction information can be presented during the digital credit application process. Presentation of the set of transaction information can include presenting the information in the same page or display as the digital credit application being completed, providing an overlay over a page or display in which the digital credit application is being completed, or any other suitable concurrent presentation. In providing the transaction information, the first customer can visualize the transaction and related details while the credit application is submitted, allowing a clearer goal as relates to the credit.

Input can be received from the customer via the assisted channel user, and can be submitted to perform a credit adjudication process based on the completed credit application to determine the first customer's creditworthiness. Any suitable adjudication process may be performed, and in some cases, additional information may be requested and/or required before a decision is made.

At 215, a determination is made as to whether the request for credit has been approved. If the request is denied, method 200 can continue at 220, where the request is rejected. In some instances, alternative cards or card options may be suggested, particularly if the customer does not meet one or more of the card requirements for the card applied for, but would meet the requirements for a different card. If the credit application is approved, method 200 can continue at 225, where a corresponding credit account and associated account information can be generated based on the information included in the credit application and the creditworthiness analysis.

After the account is generated, two sets of actions may occur. In some instances, only one of the two paths may be followed. The path beginning at 230 relates to actions for updating a customer's mobile wallet at one of their associated devices, and the path starting at 240 relates to operations for adding the payment information for the new credit account to a merchant's digital wallet. In some instances, only one of the paths may be taken, while in others, both paths may be performed. The different paths can be performed concurrently, sequentially, or in another overlapping manner in various implementations. If no merchant is associated with the new credit, and no particular merchant was identified or selected to be associated with the payment information, then only the mobile wallet operations may be performed. In some instances, the customer may elect not to use a mobile digital wallet, and only the merchant digital wallet may be sent the information. In any of those situations, the result is that the payment information associated with the newly opened credit account can be made available in real-time or near-real-time to allow for use of the payment information in future transactions.

In the mobile wallet instance, after the credit account is generated, method 200 continues at 230. At 230, at least one user device associated with the first customer is identified. The at least one user device may be a device identified previously by the first customer as a primary device where the mobile wallet is managed. In some instances, multiple devices of the first customer may store information associated with a digital wallet, such as when the first customer uses a mobile phone, a tablet, and a smart watch as payment tools. In some instances, the particular user device may be identified based on the use of that device to contact the assisted channel user during the interaction of 205. In other instances, the particular device may be identified in the credit application or the related information. In other instances, the device may already be used by the financial system 102 for storing the first customer's digital wallet.

Once the particular one or more user devices are identified, method 200 continues at 235, where a first signal can be generated and transmitted to the identified user device, the first signal including information about the new credit account. The first signal may be transmitted as a push notification to a secure financial application executing on the user device, where the connection or communication channel between the financial system and the secure financial application is secure, such as through encryption and other advanced security and identity verification operations and processes. The push notification may, in some instances, include instructions to open the secure financial application, where the secure financial application can then obtain the new payment information directly from the financial system's account book of record. In other instances, the secure financial application can receive the contents of the first signal. Once received, the user device and its secure financial application and/or the mobile wallet can cause a tokenization process to be performed, where the payment information is provided to a tokenization service and a payment token is generated. The payment token can then be added to the digital wallet, and can be used in future transactions. After 235 is complete, method 200 can continue at 265, discussed below.

Returning to after 225, the merchant wallet integration process is described, as method 200 continues at 240. At 240, an event listener associated with the financial system can identify that a new account is created. The event listener can be a part or functionality of the financial system, a separate agent or application managed by or associated with the financial system, or a third-party component. In any event, in response to the event listener identifying the newly created account, method 200 continues at 245 to determine whether the new credit account is associated with any third-party accounts, including any merchants. In some instances, where the new credit account is associated with a co-branded credit card, the association may be inherent. In other instances, the credit application process may indicate one or more merchants to whom the first customer may want the payment information provided in order to include the credit account in a corresponding merchant digital wallet. In other instances, some merchants may already be associated with the first customer (e.g., in a customer's settings and/or preferences related to their financial accounts), and may be identified as merchants to whom the customers want and have already authorized the information to be sent.

If it is determined that at least one account is associated with the new credit account at 245, method 200 continues at 260, where a second signal can be generated and securely transmitted via the communication interface to the corresponding merchant system associated with the new credit account, where the second signal includes a set of payment information and customer data associating the payment information to a particular customer account at the merchant. The secure transmission can be sent to a secure endpoint of the merchant system in some instances, where the secure endpoint may be associated with a secure communication channel, or may be associated with a private API available for sharing the payment information. Once the payment information is received, the merchant system can associate that payment information with the corresponding customer account at the merchant. In some instances, the customer data can include an identifier of a particular loyalty account at the merchant system associated with the first customer. In other instances, a login name or other identifier can be provided with the second signal to allow the merchant system to connect the payment information to the customer account of the first customer. In still other instances, a set of customer information may be sent to the merchant system, where the customer information may be used in a matching process or operation to identify a matching customer account already open at the merchant system. In instances where no match is found, then a new customer account can be generated for the first customer before the payment information is associated with the account. If multiple third-party accounts are to receive the payment information, then 260 can be performed for each.

Once the payment information is received by the respective merchant systems, those merchant systems may tokenize the payment information using a tokenization service, and receive and add the corresponding payment token into the merchant system's digital wallet for the customer. The payment information other than the payment token can be deleted or removed from the system, and the payment token can be used to perform further transactions and purchases.

At 265, the event listener can also cause a third signal to be generated and transmitted to the first customer, where the third signal includes a set of terms and conditions associated with the newly created account. In some instances, the event listener can trigger a digital communications service to initiate the transmission of the terms and conditions to the first customer. For example, a notification of the new account can be provided to the digital communications service, and the digital communications service can then prepare and transmit the correspondence through any suitable communication channel. In some instances, the transmission may include email, text or another messaging service's message, a secure message provided through a secure financial application or app, or any other suitable means. In some instances, the transmission may be to the user device identified in 230. By providing the terms and conditions, the financial system can ensure that any and all legal and regulatory notifications and information are sent in connection with the new account, and can provide a convenient way to review the information for the first customer. It is noted that even where a merchant wallet is not updated, the event listener can cause the third signal to be generated at 265. FIG. 2 illustrates a dashed line from 235 to 260, indicating that such operations will occur even in mobile wallet-only instances. In some instances, the operations of 265 may be performed before those of either 230 and/or 240, or may be performed concurrently to them and their related operations.

Figure 3:
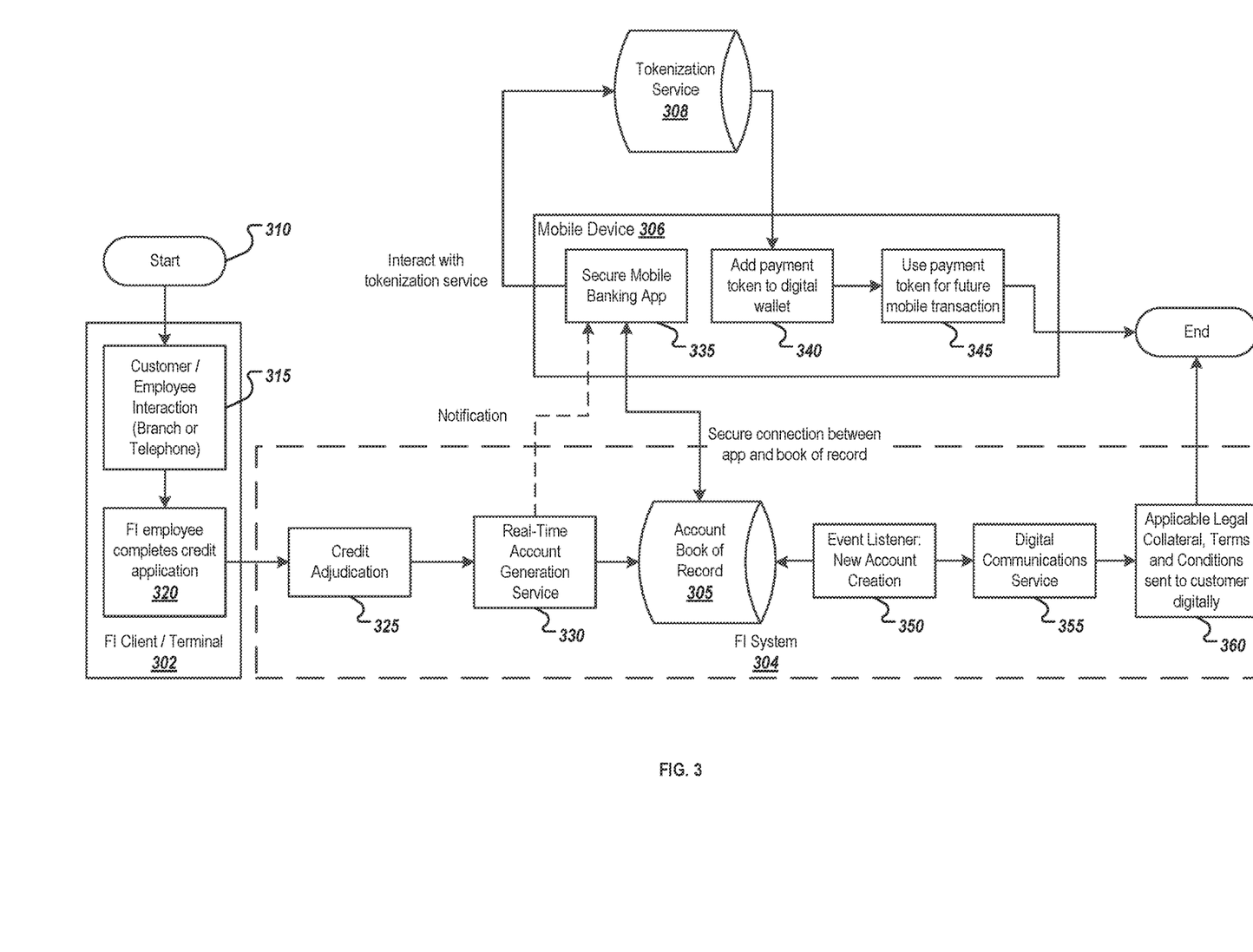
FIG. 3 illustrates a data and control flow of example interactions performed in providing assisted channel credit application completion with customers at a financial institution, where the completion and approval of the credit application results in an automatic integration of payment credentials into a corresponding mobile digital wallet in a first example implementation.

FIG. 3 illustrates a data and control flow 300 of example interactions performed in providing assisted channel credit application completion with customers at a financial institution, where the completion and approval of the credit application results in an automatic integration of payment credentials into a corresponding mobile digital wallet in a first example implementation. As noted, the illustration of FIG. 3 describes the operations of a mobile digital wallet integration, while FIG. 4 describes the operations of a merchant wallet integration. In at least some instances, the operations of FIG. 3 and FIG. 4 may be performed at least partially at the same time, and may share at least some of the operations and actions described. For purposes of illustration, these flows have been split here, but a person of skill in the art is capable of understanding a combined flow where both wallet integrations are performed in response to a particular assisted channel interaction.

As shown, FIG. 3 is illustrated with interactions between a financial institution (FI) client or terminal 302 that is accessed by an assisted channel user or FI employee, an FI system 304, a mobile device 306 at which a mobile digital wallet is maintained, and a tokenization service 308. The interactions begin at 310, and, as described, a customer may visit a branch of the financial institution, or may call into a phone-based assisted channel, and can interact (315) with the assisted channel user or FI employee to discuss one or more options for potential credit accounts. Based on the interaction, or based on a specific customer request, a particular credit account can be applied for using the assisted channel user as the person to enter the input. At 320, the assisted channel user can complete the credit application using their terminal or device, which may be a part of the FI system 304, or may be a remote device connected, for example, via an Internet or Intranet connection to the FI system 304.

Once the credit application is completed, at 325 a credit adjudication process is performed at the FI system 304. If the customer is approved for credit, at 330, a real-time account generation service can create the approved account, and add that account information to the account book of record 305. The account book of record 305 can incorporate any available information associated with the account, including any information received from the customer during the assisted channel interaction, as well as any information about one or more related accounts (e.g., customer accounts at a merchant system or other accounts at the FI system 304), thereby allowing the accounts to be tangentially linked. Once the new account is generated, the FI system 304 can, in some instances, notify a mobile device 306 associated with the customer that the new account information is available. The mobile device 306 may be associated with the customer's new account or an existing related account, in some instances, or may be associated with the customer after the new account is opened.

A secure mobile banking application 335 can access the account book of record 305, such as in response to a notification of the new account, to obtain information about the account, including the set of payment information. The secure mobile banking application 335 can be a secure application in that the connection between the application 335 and the FI system 304 is a trusted and secure connection, or that a secure connection between the application 335 and the FI system 304 can be created. The secure mobile banking application 335 can be an application created or provided by the FI system 304 to interact with the FI system 304 from customers' mobile and/or other user devices, such that protected protocols, communication encryption, and other suitable protections can be built into the application 335 itself.

Once the payment information is obtained by the secure mobile banking application 335, the application 335 can trigger a tokenization operation with the tokenization service 308. Providing the payment information to the tokenization service 308 can generate a payment token that can be used in lieu of the payment information. Once the payment token is created and received back at the mobile device 306, the payment token can be added to a mobile digital wallet of the mobile device 306 at 340. In doing so, the payment token can then be used for immediate and future mobile transactions (at 345), even without a physical card being generated or present.

Returning to after the new credit account is generated, an event listener at the FI system 304 can, at 350, identify the creation of the new account, and can subsequently initiate or trigger operations of a digital communications service (355). The digital communications service can initiate and manage the provision of any related legal information, including terms and conditions, related to the new credit account. That information can include finance charges, interest rates, credit available, and other relevant information, and may be required by legal and/or regulatory authorities. The information can, in many jurisdictions, be provided digitally. In those instances, the digital communications service can transmit the information to the customer digitally (e.g., via email, text message, secure financial application messaging, or any other digital channel or interaction) at 360, or alternatively, can initiate the physical sending of any applicable information, where appropriate.

Figure 4:
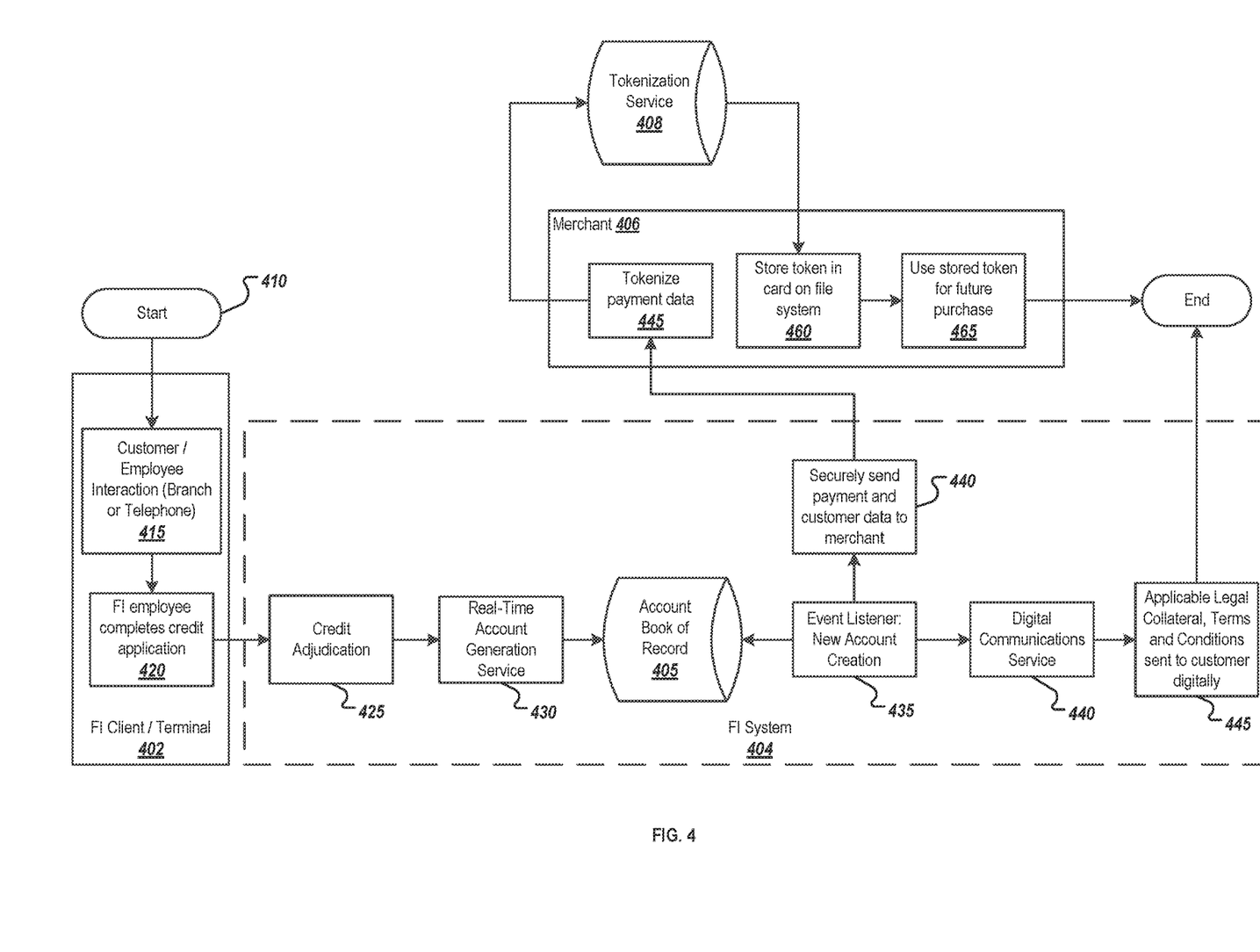
FIG. 4 illustrates a data and control flow of example interactions performed in providing assisted channel credit application completion with customers at a financial institution, where the completion and approval of the credit application results in an automatic integration of payment credentials into a corresponding merchant-based digital wallet in a second example implementation.

FIG. 4 illustrates a data and control flow 400 of example interactions performed in providing assisted channel credit application completion with customers at a financial institution, where the completion and approval of the credit application results in an automatic integration of payment credentials into a corresponding merchant-based digital wallet in a second example implementation. As described flow 400 is directed to the FI system's interaction with a merchant 406 and its digital wallet, while flow 300 is directed to interactions with the mobile device 306. For the description herein, at least some of the illustrated components and actions may be similar to those described in FIG. 3.

At 410, the process begins, and at 415, a customer may visit a branch of the financial institution, or may call into a phone-based assisted channel, and can interact with the assisted channel user or FI employee to discuss one or more options for potential credit accounts. Based on the interaction, or based on a specific customer request, a particular credit account can be applied for using the assisted channel user as the person to enter the input. In this example, the particular credit account may be associated with a co-branded partner, such as merchant 406. Alternatively, the customer may actively identify merchant 406 as a merchant to whom payment information should be provided, or may have already selected the merchant 406 as such prior to the application being submitted. At 420, the assisted channel user can complete the credit application using their terminal or device using personal and financial information provided by the customer.

Once the credit application is completed, at 425 a credit adjudication process is performed at the FI system 404. If the customer is approved for credit, at 430, a real-time account generation service can create the approved account, and add that account information to the account book of record 405, which may be similar to or the same as the account book of record 305.

An event listener can monitor and detect new account creations at 435. In response to identifying the new accounts, the event listener can perform two actions as illustrated. In a first action, the event listener can identify the new account that is created, and, at 440, securely transmit a set of payment information corresponding to the new account to the merchant 406, where the set of payment information is also associated with a customer identifier or customer-associated information from the account book of record 405. In some instances, that account information may include a loyalty number or other customer account identifier (e.g., a username) that uniquely identifies the customer at the merchant 406. Alternatively, a set of information may be used to allow the merchant 406 to derive the particular customer associated with the information. The secure transmission of 440 can be transmitted securely (e.g., via encryption, encoding, etc.) and/or to a private endpoint associated with the merchant 406.

The merchant 406, or a wallet system or another portion or agent of the merchant 406) can receive the secure payment information and associate that information with the corresponding customer account. As illustrated, the received payment information can be tokenized at 445, where tokenization includes providing the payment information to a tokenization service 408, which can generate a payment token that can be used in lieu of the received payment information. Once the payment token is created and received back at the merchant 406, the payment token can be stored in a set of customer card on file data within the merchant's digital wallet at 460, and can be available for immediate use. Once the payment token is available, the customer can complete the transaction by moving to 465, where the stored token can be used to complete future purchases.

Returning to 435, in addition to the secure transmission of the payment data at 440, the event listener can also initiate or trigger operations of a digital communications service at 440, which may be similar to 355 of FIG. 3. The digital communications service can then transmit the information to the customer digitally at 445, similar to 360 of FIG. 3, or alternatively, can initiate the physical sending of any applicable information, where appropriate.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed during an ongoing user transaction between a first user device and a first merchant system, the method comprising: executing, by a server via the first user device, a first mobile application;
   during the ongoing transaction, receiving, by the server, a request for a new credit account from the first mobile application;
   in response to receiving the request for a new credit account, generating, by the server, first data, wherein the first data includes (i) an account number, (ii) user login credentials, and (iii) payment information;
   creating, by the server, the requested new credit account identifying, by the server, based on the request (i) a set of one or more user devices, wherein the set of user devices includes the first user device and (ii) a set of one or more merchant systems, wherein the set of one or more merchant systems includes the first merchant system;

based on the identification of the set of user devices and the set of one or more merchant systems, encrypting, by the server, at least a portion of the first data including (i) the user login credentials and (ii) the payment information;

transmitting, by the server, (i) the encrypted user login credentials to the first user device and (ii) the encrypted payment information to the first merchant system;

executing, by the server via the first user device, a second application;

receiving, by the server and from the first user device, a login request for the second application, wherein the login request includes the transmitted encrypted user login credentials, unencrypted; and providing, by the server via the second application, and based on the received unencrypted user login credentials, information associated with the created new credit account.

2. The method of claim 1, comprising: initiating, by the server, generation of a payment token on the first user device by transmitting the encrypted user login credentials to the first user device; and initiating, by the server, adding of a token for the ongoing user transaction to a digital wallet associated with the first user device by transmitting the encrypted payment information to the first merchant system.

3. The method of claim 2, comprising: initiating, by the server, a matching process on the first merchant system by transmitting the encrypted payment information to the first merchant system.

4. The method of claim 1, wherein the request for the new credit account includes an identification of the first merchant system.

5. The method of claim 1, comprising: identifying, by the server, a set of terms and conditions for the new credit account;

encrypting, by the server, the set of terms and conditions for the new credit account; and transmitting, by the server, the encrypted set of terms and conditions to the first user device.

6. The method of claim 1, wherein receiving the request for the new credit account from the first mobile application comprises: receiving, by the server, the request for the new credit account from the first mobile application via a teller application.

7. The method of claim 1, wherein generating the first data includes: generating a new account number for the new credit account.

8. The method of claim 1, wherein generating the first data includes: generating user login credentials that match a preexisting user login credentials in a preexisting account associated with a user of the first user device.

9. A system comprising one or more computers and one or more storage devices on which are stored instructions that are operable, when executed by the one or more computers, to cause the one or more computers to perform operations during an ongoing user transaction between a first user device and a first merchant system, the operations comprising: executing, via the first user device, a first mobile application;

during the ongoing transaction, receiving a request for a new credit account from the first mobile application;

in response to receiving the request for a new credit account, generating first data, wherein the first data includes (i) an account number, (ii) user login credentials, and (iii) payment information;

creating the requested new credit account identifying based on the request (i) a set of one or more user devices, wherein the set of user devices includes the first user device and (ii) a set of one or more merchant systems, wherein the set of one or more merchant systems includes the first merchant system;

based on the identification of the set of user devices and the set of one or more merchant systems, encrypting at least a portion of the first data including (i) the user login credentials and (ii) the payment information;

transmitting (i) the encrypted user login credentials to the first user device and (ii) the encrypted payment information to the first merchant system;

executing, via the first user device, a second application;

receiving, from the first user device, a login request for the second application, wherein the login request includes the transmitted encrypted user login credentials, unencrypted; and providing, via the second application, and based on the received unencrypted user login credentials, information associated with the created new credit account.

10. The system of claim 9, wherein the operations comprise: initiating generation of a payment token on the first user device by transmitting the encrypted user login credentials to the first user device; and initiating adding of a token for the ongoing user transaction to a digital wallet associated with the first user device by transmitting the encrypted payment information to the first merchant system.

11. The system of claim 10, wherein the operations comprise: initiating a matching process on the first merchant system by transmitting the encrypted payment information to the first merchant system.

12. The system of claim 9, wherein the request for the new credit account includes an identification of the first merchant system.

13. The system of claim 9, wherein the operations comprise: identifying a set of terms and conditions for the new credit account;

encrypting the set of terms and conditions for the new credit account; and transmitting the encrypted set of terms and conditions to the first user device.

14. The system of claim 9, wherein receiving the request for the new credit account from the first mobile application comprises: receiving the request for the new credit account from the first mobile application via a teller application.

15. The system of claim 9, wherein generating the first data includes: generating a new account number for the new credit account.

16. The system of claim 9, wherein generating the first data includes: generating user login credentials that match a preexisting user login credentials in a preexisting account associated with a user of the first user device.

17. One or more computer storage media encoded with instructions that, when executed by one or more computers, cause the one or more computers to perform operations during an ongoing user transaction between a first user device and a first merchant system, the operations comprising: executing, via the first user device, a first mobile application;

during the ongoing transaction, receiving a request for a new credit account from the first mobile application;

in response to receiving the request for a new credit account, generating first data, wherein the first data includes (i) an account number, (ii) user login credentials, and (iii) payment information;

creating the requested new credit account identifying based on the request (i) a set of one or more user devices, wherein the set of user devices includes the first user device and (ii) a set of one or more merchant systems, wherein the set of one or more merchant systems includes the first merchant system;

based on the identification of the set of user devices and the set of one or more merchant systems, encrypting at least a portion of the first data including (i) the user login credentials and (ii) the payment information;

transmitting (i) the encrypted user login credentials to the first user device and (ii) the encrypted payment information to the first merchant system;

executing, via the first user device, a second application;

receiving, from the first user device, a login request for the second application, wherein the login request includes the transmitted encrypted user login credentials, unencrypted; and providing, via the second application, and based on the received unencrypted user login credentials, information associated with the created new credit account.

18. The medium of claim 17, wherein the operations comprise: initiating generation of a payment token on the first user device by transmitting the encrypted user login credentials to the first user device; and initiating adding of a token for the ongoing user transaction to a digital wallet associated with the first user device by transmitting the encrypted payment information to the first merchant system.

19. The medium of claim 18, wherein the operations comprise: initiating a matching process on the first merchant system by transmitting the encrypted payment information to the first merchant system.

20. The medium of claim 17, wherein the request for the new credit account includes an identification of the first merchant system.

* * * * *

UNITED STATES PATENT AND TRADEMARK OFFICE
CERTIFICATE OF CORRECTION

| | | |
|---|---|---|
| PATENT NO. | : 12,062,089 B2 | |
| APPLICATION NO. | : 16/670601 | |
| DATED | : August 13, 2024 | |
| INVENTOR(S) | : Adrian Bloy et al. | |

It is certified that error appears in the above-identified patent and that said Letters Patent is hereby corrected as shown below:

On the Title Page

Item (73), under Assignee, Line 1, delete "Bank" and insert --Bank, Toronto (CA)--.

Signed and Sealed this
First Day of October, 2024

Katherine Kelly Vidal
Director of the United States Patent and Trademark Office